United States Patent
Yoshino et al.

(10) Patent No.: US 10,823,563 B2
(45) Date of Patent: Nov. 3, 2020

(54) LASER SCANNER SYSTEM

(71) Applicant: TOPCON Corporation, Itabashi-ku, Tokyo-to (JP)

(72) Inventors: Ken-ichiro Yoshino, Tokyo-to (JP); Tadayuki Ito, Tokyo-to (JP); Takahiro Komeichi, Tokyo-to (JP)

(73) Assignee: TOPCON Corporation, Tokyo-to (JP)

( * ) Notice: Subject to any disclaimer, the term of this patent is extended or adjusted under 35 U.S.C. 154(b) by 0 days.

(21) Appl. No.: 16/524,329

(22) Filed: Jul. 29, 2019

(65) Prior Publication Data

US 2020/0041268 A1 Feb. 6, 2020

(30) Foreign Application Priority Data

Aug. 3, 2018 (JP) ................................. 2018-146746

(51) Int. Cl.
| | | |
|---|---|---|
| G01C 15/00 | (2006.01) | |
| G01S 7/481 | (2006.01) | |
| G01S 17/42 | (2006.01) | |
| G01B 11/00 | (2006.01) | |
| G01S 13/46 | (2006.01) | |
| G01S 15/46 | (2006.01) | |

(52) U.S. Cl.
CPC .......... *G01C 15/002* (2013.01); *G01B 11/002* (2013.01); *G01S 7/4817* (2013.01); *G01S 17/42* (2013.01); *G01S 2013/466* (2013.01); *G01S 2015/465* (2013.01); *G06T 2207/10028* (2013.01)

(58) Field of Classification Search
CPC .. G01B 11/002; G01C 15/002; G01C 15/004; G01C 15/006; G01S 7/4817; G01S 7/4865; G01S 7/4866; G01S 17/42; G01S 2013/466; G01S 2015/465; G06T 2207/10028

USPC ........................................................ 356/614
See application file for complete search history.

(56) References Cited

U.S. PATENT DOCUMENTS

| 5,715,166 A | 2/1998 | Besl et al. |
|---|---|---|
| 5,912,644 A | 6/1999 | Wang |
| 9,562,971 B2 | 2/2017 | Shenkar et al. |
| 9,921,062 B2 | 3/2018 | Yoshino |
| 2016/0259039 A1 | 9/2016 | Ohtomo et al. |

(Continued)

FOREIGN PATENT DOCUMENTS

JP 2016-161411 A 9/2016

OTHER PUBLICATIONS

European communication dated Dec. 5, 2019 in corresponding European patent application No. 19189276.9.

*Primary Examiner* — Colin W Kreutzer
(74) *Attorney, Agent, or Firm* — Nields, Lemack & Frame, LLC

(57) ABSTRACT

A laser scanner which includes a mobile station calculates a two-dimensional fixed station coordinate system formed at least three fixed stations, calculates coordinates of intersections of at least three circles, which have the fixed stations as their centers and the distances between each of the fixed stations and the mobile station as their radii, at every predetermined angle as each positioning result of the mobile station while horizontally rotating the laser scanner by 360° around a mechanical point, averages each of the positioning results corresponding to 360° and calculates approximate mechanical point coordinates in the fixed station coordinate system.

18 Claims, 7 Drawing Sheets

(56) References Cited

U.S. PATENT DOCUMENTS

2016/0291160 A1* 10/2016 Zweigle .................. G01S 17/42
2020/0256974 A1*  8/2020 Kim ....................... G01S 13/72

* cited by examiner

LASER SCANNER SYSTEM

BACKGROUND OF THE INVENTION

The present invention relates to a laser scanner system for acquiring point cloud data from a plurality of points by a laser scanner and integrating the plurality of point cloud data as point cloud data of the same coordinate system.

As a surveying instrument, there is a total station or a three-dimensional laser scanner. The total station is used in case of measuring a point to be measured. The three-dimensional laser scanner obtains a shape of an object to be measured a set of an infinite number of points having three-dimensional coordinates, that is, three-dimensional point cloud data.

At the time of acquiring the three-dimensional point cloud data by the three-dimensional laser scanner, particularly in a building, there is a case where the three-dimensional point cloud data of an entire room cannot be acquired in a measurement performed from one point due to a shape of the room or an obstacle such as a pillar. In this case, the three-dimensional point cloud data is acquired at a plurality of points, the plurality of acquired three-dimensional point cloud data is integrated (performed a registration), and the three-dimensional point cloud data of the entire room can be acquired.

Conventionally, a plurality of target sheets are attached in a building, the target sheets are detected from the three-dimensional point cloud data, the plurality of point cloud data are associated with each other via corresponding target sheets, and thus a registration between the three-dimensional point cloud data is performed.

Further, as a method for automatically performing the registration, there is a method using an ICP (Iterative Closest Point) algorithm disclosed in U.S. Pat. No. 5,715,166. In the ICP algorithm, an approximate mechanical point (origin of a laser scanner coordinate system) coordinates and an approximate azimuth angle of the laser scanner are required as initial values.

However, conventionally, there is no method for automatically calculating the approximate mechanical point coordinates and the approximate azimuth angle of the laser scanner. For this reason, a processing to approximately match the mechanical points and the azimuth angles between the plurality of three-dimensional point cloud data need to be manually performed by the worker.

SUMMARY OF THE INVENTION

It is an object of the present invention to provide a laser scanner system for automatically calculating approximate mechanical point coordinates and an approximate azimuth angle of a laser scanner.

To attain the object as described above, a laser scanner system according to the present invention comprises a laser scanner which has a mobile station and for acquiring three-dimensional point cloud data, and at least three fixed stations, wherein the laser scanner comprises a mobile station which is offset to a known position from a mechanical point on a horizontal rotation axis of the laser scanner, a horizontal angle detecting module for detecting a relative horizontal angle of the laser scanner and an arithmetic control module for controlling a horizontal rotation of the laser scanner, wherein the fixed stations are configured to emit pulses to the mobile station and to measure distances to the mobile station by receiving the pulses from the mobile station, and wherein the arithmetic control module is configured to calculate a two-dimensional fixed station coordinate system formed each of the fixed stations, to calculate coordinates of intersections of at least three circles, which have the fixed stations as their centers and the distances between each of the fixed stations and the mobile station as their radii, at every predetermined angle as each positioning result of the mobile station while horizontally rotating the laser scanner by 360° around the mechanical point, to average each of the positioning results corresponding to 360° and to calculate approximate mechanical point coordinates in the fixed station coordinate system.

Further, in the laser scanner system according to a preferred embodiment, the arithmetic control module corresponds an approximate rotation angle formed by a straight line connecting the mechanical point with the mobile station and a reference axis of the fixed station coordinate system with the relative horizontal angle detected by the horizontal angle detecting module based on the positioning results of the mobile station and calculates the relative horizontal angle of when the approximate rotation angle becomes 0° as an approximate azimuth angle.

Further, in the laser scanner system according to a preferred embodiment, the arithmetic control module determines the calculated approximate mechanical point coordinates and approximate azimuth angle as initial values and integrates a plurality of three-dimensional point cloud data acquired by the laser scanner.

Further, in the laser scanner system according to a preferred embodiment, each of the fixed stations has known three-dimensional coordinates.

Further, in the laser scanner system according to a preferred embodiment, each of the fixed stations is configured to measure distances to the other fixed stations, and wherein the arithmetic control module sets positions of two of the fixed stations in the fixed station coordinate system, calculates two candidate positions of the remaining fixed station based on at least two points at which at least two circles having the two fixed stations as their centers and distances to the remaining fixed station as their radii cross each other, obtains a locus of the positioning results of the mobile station at each candidate position respectively and determines the candidate position having a locus obtained in a rotational direction which coincides with a rotational direction of a frame unit as an installation position of the remaining fixed station.

Further, in the laser scanner system according to a preferred embodiment, after calculating the approximate mechanical point coordinates and the approximate azimuth angle, one of the fixed stations and the mobile station are moved, and the arithmetic control module again calculates the approximate mechanical point coordinates and the approximate azimuth angle.

Further, in the laser scanner system according to a preferred embodiment, barometric sensors are provided in the mobile station and at least one of the fixed stations respectively, and the arithmetic control module calculates a relative height of the mobile station with respect to the fixed station based on detection results by each of the barometric sensors and calculates three-dimensional approximate mechanical point coordinates based on the calculated height.

Furthermore, in the laser scanner system according to a preferred embodiment, each of the fixed stations is provided in a fixed station device respectively, and the fixed station device comprises a target of which three-dimensional coordinates can be measured by the laser scanner.

According to the present invention, the laser scanner system comprises a laser scanner which has a mobile station and for acquiring three-dimensional point cloud data, and at least three fixed stations, wherein the laser scanner comprises a mobile station which is offset to a known position from a mechanical point on a horizontal rotation axis of the laser scanner, a horizontal angle detecting module for detecting a relative horizontal angle of the laser scanner and an arithmetic control module for controlling a horizontal rotation of the laser scanner, wherein the fixed stations are configured to emit pulses to the mobile station and to measure distances to the mobile station by receiving the pulses from the mobile station, and wherein the arithmetic control module is configured to calculate a two-dimensional fixed station coordinate system formed each of the fixed stations, to calculate coordinates of intersections of at least three circles, which have the fixed stations as their centers and the distances between each of the fixed stations and the mobile station as their radii, at every predetermined angle as each positioning result of the mobile station while horizontally rotating the laser scanner by 360° around the mechanical point, to average each of the positioning results corresponding to 360° and to calculate approximate mechanical point coordinates in the fixed station coordinate system. As a result, an error can be reduced and a positioning accuracy of the approximate mechanical point coordinates can be improved as compared with a case where the mobile station is concentrically provided with the mechanical point and a positioning is performed.

DETAILED DESCRIPTION OF THE PREFERRED EMBODIMENTS

Figure 1:
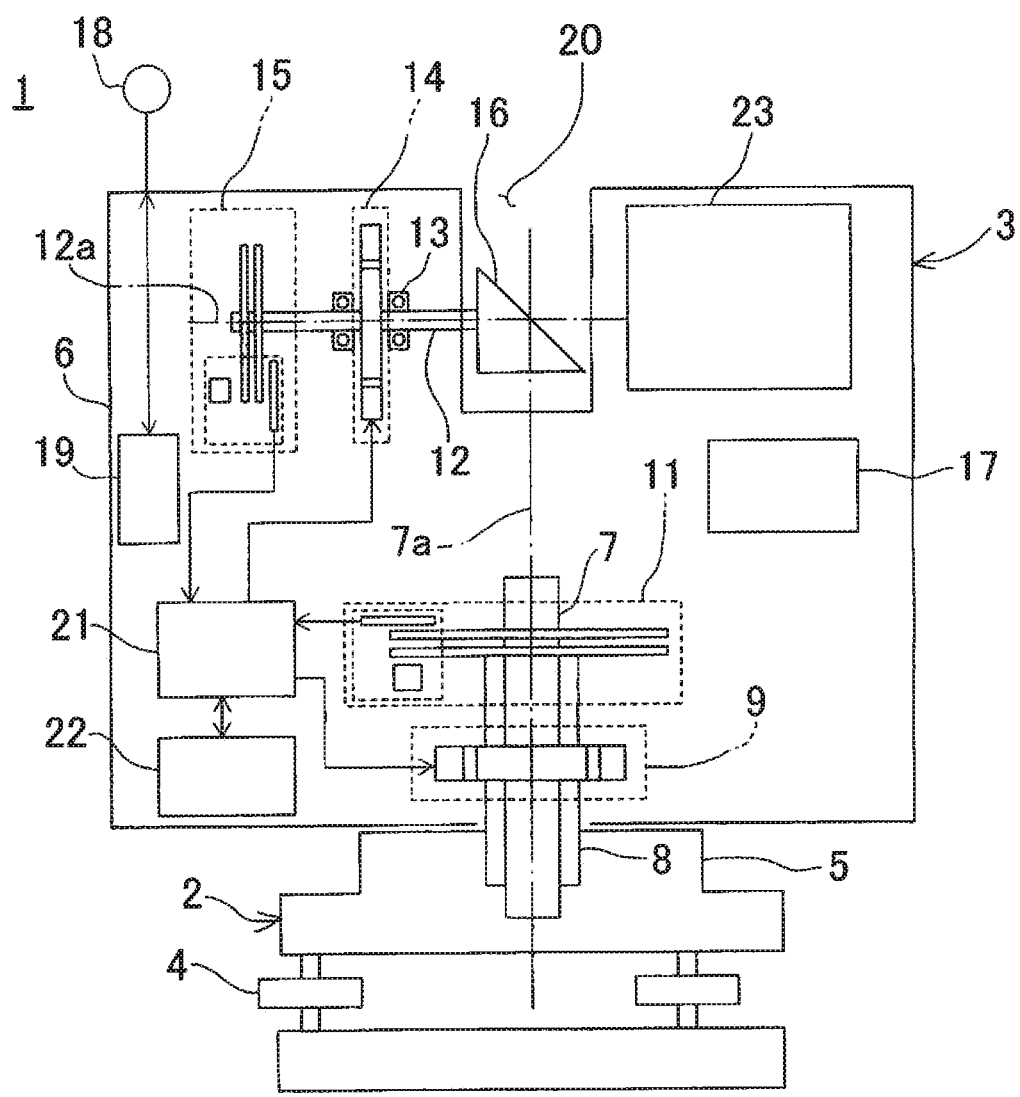
FIG. 1 is a front cross-sectional view to show a laser scanner according to a first embodiment of the present invention.

A description will be given below on embodiments of the present invention by referring to the attached drawings.

First, in FIG. 1, a description will be given on a laser scanner according to a first embodiment of the present invention.

A laser scanner 1 has a leveling module 2 attached on a tripod (not shown) and a scanner main body 3 provided on the leveling module 2.

The leveling module 2 has leveling screws 4, and the scanner main body 3 is leveled by the leveling screws 4.

The scanner main body 3 comprises a fixed portion 5, a frame unit 6, a horizontal rotation shaft 7, a horizontal rotation bearing 8, a horizontal rotation motor 9 as a horizontal rotary driving module, a horizontal angle encoder 11 as a horizontal angle detecting module, a vertical rotation shaft 12, a vertical rotation bearing 13, a vertical rotation motor 14 as a vertical rotary driving module, a vertical angle encoder 15 as a vertical angle detecting module, a scanning mirror 16 as a vertical rotation member, an operation panel 17 which functions as both an operation module and a display module, an antenna 18, a mobile station 19, an arithmetic control module 21, a storage module 22, a distance measuring module 23 configured as an electronic distance meter (EDM) and others.

The horizontal rotation bearing 8 is fixed to the fixed portion 5. The horizontal rotation shaft 7 has a vertical axis 7a, and the horizontal rotation shaft 7 is rotatably supported by the horizontal rotation bearing 8. Further, the frame unit 6 is supported by the horizontal rotation shaft 7, and the frame unit 6 is integrally rotated with the horizontal rotation shaft 7 in a horizontal direction.

The horizontal rotation motor 9 is provided between the horizontal rotation bearing 8 and the frame unit 6, and the horizontal rotation motor 9 is controlled by the arithmetic control module 21. The arithmetic control module 21 rotates the frame unit 6 around the axis 7a by the horizontal rotation motor 9.

A relative rotation angle of the frame unit 6 with respect to the fixed portion 5 is detected by the horizontal angle encoder 11. A detection signal from the horizontal angle encoder 11 is input to the arithmetic control module 21, and horizontal angle data is calculated by the arithmetic control module 21. The arithmetic control module 21 executes a feedback control with respect to the horizontal rotation motor 9 based on the horizontal angle data.

Further, in the frame unit 6, the vertical rotation shaft 12 having a horizontal axis 12a is provided. The vertical rotation shaft 12 is rotatable via the vertical rotation bearing 13. It is to be noted that an intersection of the axis 7a and the axis 12a is a projecting position of a distance measuring light and an origin (mechanical point) of a coordinate system of the scanner main body 3.

In the frame unit 6, a recessed part 20 is formed. One end portion of the vertical rotation shaft 12 is extended in the recessed part 20. The scanning mirror 16 is fixed to the one end portion, and the scanning mirror 16 is accommodated in the recessed part 20. Further, at the other end portion of the vertical rotation shaft 12, the vertical angle encoder 15 is provided.

The vertical rotation motor 14 is provided on the vertical rotation shaft 12, and the vertical rotation motor 14 is controlled by the arithmetic control module 21. The arithmetic control module 21 rotates the vertical rotation shaft 12 by the vertical rotation motor 14, and the scanning mirror 16 is rotated around the axis 12a.

A rotation angle of the scanning mirror 16 is detected by the vertical angle encoder 15, and a detection signal is input to the arithmetic control module 21. The arithmetic control module 21 calculates vertical angle data of the scanning mirror 16 based on the detection signal and executes a feedback control with respect to the vertical rotation motor 14 based on the vertical angle data.

The antenna 18 is provided on an upper surface of the frame unit 6. The antenna 18 enables to transmit and receive pulses of electromagnetic waves and the like and transfer data to and from a fixed station (to be described later) by a wireless communication such as, for instance, UWA (Ultra Wide Band). Further, the antenna 18 is offset with respect to the axis 7*a* and the axis 12*a* respectively, and a distance with respect to the axis 7*a* and a distance with respect to the axis 12*a* are known. That is, an offset amount of the antenna 18 with respect to the mechanical point is known.

The mobile station 19 is connected to the antenna 18. The mobile station 19 has a function to receive electromagnetic pulses emitted from the fixed station (to be described later) through the antenna 18 and further transmit pulses corresponding to the received pulses to the fixed station. Further, the mobile station 19 has a function to transmit the pulses to the fixed station, receive the pulses from the fixed station and measure a distance to the fixed station. Further, the mobile station 19 has a function to receive distance data to the mobile station 19 measured by the fixed station.

As the arithmetic control module 21, a general-purpose CPU for a microprocessor or a CPU specialized for this instrument is used. The horizontal angle data and the vertical angle data calculated by the arithmetic control module 21, a distance measurement result, the distance data between the mobile station 19 and the fixed station, coordinates of the fixed station, approximate coordinates and an approximate direction of the mobile station 19 (to be described later) and the like are stored in the storage module 22. A part of the storage module 22, which stores the horizontal angle data, the vertical angle data, the distance measurement result, the distance data between the mobile station 19 and the fixed station, the coordinates of the fixed station, the approximate coordinates and approximate direction of the mobile station 19 (to be described later) and the like, may be attachable and detachable to and from the frame unit 6, or the data may enable to be transmitted to an external storage device or an external data processing device through the communicating means (not shown).

Further, as the storage module 22, a device like a semiconductor device such as a RAM, a ROM a flash ROM or a DRAM, a magnetic device such as an HDD, an optical device such as a CDROM is appropriately used.

In the storage device 22 are stored programs such as a program configured to perform the distance measurement and the angle measurement of a measuring point, a program configured to drive the horizontal rotation motor 9 and the vertical rotation motor 14, a program configured to calculate the approximate coordinates of the mobile station 19 with respect to the fixed station, a program configured to calculate an approximate direction of the mobile station 19, a program configured to perform a registration of a plurality of three-dimensional point cloud data and other programs. The arithmetic control module 21 executes various kinds of processings according to the embodiments of the present invention based on each of the programs stored in the storage module 22.

The operation panel 17 is, for instance, a touch panel, and functions as both an operation module for executing an instruction of the distance measurement or changing measurement conditions, for instance, a measuring point interval and the like, and a display module for displaying the distance measurement result and the like.

The distance measuring module 23 enables to project a distance measuring light which is a pulsed light or a burst-emitted light. The distance measuring module 23 projects the distance measuring light and receives a reflected distance measuring light from a measuring point of an object to be measured. A projection timing of the distance measuring light and a reception timing of the reflected distance measuring light are input to the arithmetic control module 21, respectively. It is to be noted that the burst-emitted light is disclosed in Japanese Patent Application Publication No. 2016-161411.

A description will be given on a case where the measurement is performed by the laser scanner 1.

The distance measuring light projected from the distance measuring module 23 enters the scanning mirror 16. At this time, an optical axis of the distance measuring light coincides with the axis 12*a*, and the distance measuring light is deflected at a right angle by the scanning mirror 16. When the scanning mirror 16 rotates around the axis 12*a*, the distance measuring light becomes orthogonal to the axis 12*a* and is rotated (scanned) within a plane including the axis 7*a*. The distance measuring light reflected by the scanning mirror 16 is irradiated to a predetermined measuring point of the object to be measured, and the object to be measured is scanned. The reflected distance measuring light reflected on the measuring point is reflected at a right angle by the scanning mirror 16 and is received by the distance measuring module 23.

The arithmetic control module 21 performs the distance measurement for each pulse of the distance measuring light (Time of Flight) based on a time difference between the projection timing of the distance measuring light and the reception timing of the reflected distance measuring light (that is, a round-trip time of the pulsed light) and a light velocity. Further, the arithmetic control module 21 can change the projection timing of the distance measuring light, that is, a pulse interval.

It is to be noted that, when an internal reference light optical system is provided in the distance measuring module 23 and the distance measurement is performed based on a time difference between a reception timing of the internal reference light and the reception timing of the reflected distance measuring light, a further more accurate distance measurement can be carried out.

Further, the frame unit 6 and the scanning mirror 16 rotate at a constant speed respectively, and by a cooperation between a rotation of the scanning mirror 16 in the vertical direction and the rotation of the frame unit 6 in the horizontal direction, the distance measuring light is two-dimensionally scanned. Further, distance data (slope distance) is acquired by the distance measurement for each pulsed light, and by detecting a vertical angle and a horizontal angle by the vertical angle encoder 15 and the horizontal angle encoder 11 for each pulsed light, the vertical angle data and the horizontal angle data can be acquired. By the vertical angle data, the horizontal angle data and the distance data, three-dimensional point cloud data (positional information) of the object to be measured can be acquired.

In a case where the object to be measured has a complicated shape or in a case where there is a blind area in a measurement range, it is necessary to change an installation position of the laser scanner 1 and to acquire a plurality of three-dimensional point cloud data. Further, it is necessary to associate and integrate the plurality of acquired three-dimensional point cloud data with each other. As a method for integrating (performing the registration of) the plurality of three-dimensional point cloud data acquired by the laser scanner 1, there is a registration using an ICP (Iterative Closest Point) algorithm as disclosed in U.S. Pat. No. 5,715,166.

The ICP algorithm is an algorithm for automatically performing the registration of a plurality of three-dimensional point cloud data. When the ICP algorithm is used, the registration of the plurality of three-dimensional point cloud data can be carried out without attaching a lot of target sheets in a building.

On the other hand, in the registration using the ICP algorithm, it is necessary to input approximate mechanical point coordinates and an approximate azimuth of the laser scanner 1 as initial values to the ICP algorithm. Therefore, in order to use the ICP algorithm, it is necessary to measure the approximate mechanical point coordinates and the approximate azimuth of the laser scanner 1 in advance.

By referring to FIG. 2, a description will be given below on a method for measuring a position (positioning) of the approximate mechanical point of the laser scanner 1. It is to be noted that, in the following description, an installation surface is flat and a height of the mechanical point does not change irrespective of an installation position of the laser scanner 1.

In the present embodiment, a first fixed station 24, a second fixed station 25 and a third fixed station 26 are installed at known positions apart from the laser scanner 1 respectively and have known coordinates. Further, distances between each of the fixed stations, that is, the first fixed station 24, the second fixed station 25 and the third fixed station 26, are also known. Therefore, positions of the first fixed station 24, the second fixed station 25 and the third fixed station 26 can be represented using a two-dimensional coordinate system (fixed station coordinate system) with, for instance, the first fixed station 24, as an origin.

Further, in the present embodiment, a local positioning (positioning) of the laser scanner 1 using an ultra wide band (UWB) is performed. In the positioning using UWB, at least three fixed stations are required for one mobile station. In the present embodiment, the first fixed station 24, the second fixed station 25 and the third fixed station 26 are used for the laser scanner 1 in which the mobile station 19 is built-in.

In the positioning using UWB, very short pulses such as a unit in a nanosecond are transmitted from the stations which perform the distance measurement (for instance, the first fixed station 24, the second fixed station 25 and the third fixed station 26) to a station which is a station to be a distance measurement target (for instance, the mobile station 19). Further, the mobile station 19 transmits pulses corresponding to the received pulses to the first fixed station 24, the second fixed station 25 and the third fixed station 26. The first fixed station 24, the second fixed station 25 and the third fixed station 26 measure distances to the mobile station 19 based on times required for the first fixed station 24, the second fixed station 25 and the third fixed station 26 to receive the pulses after the transmission and a propagation velocity of the pulses, that is, the light velocity, respectively.

It is to be noted that the first fixed station 24, the second fixed station 25 and the third fixed station 26 transmit the pulses to the mobile station 19 with, for instance, a time difference. The mobile station 19 distinguishes the first fixed station 24, the second fixed station 25 and the third fixed station 26 based on the time difference. Alternatively, the first fixed station 24, the second fixed station 25 and the third fixed station 26 may transmit the pulses to the mobile station 19 together with identification signals. The mobile station 19 distinguishes the first fixed station 24, the second fixed station 25 and the third fixed station 26 based on the identification signals. In this case, the pulses transmitted from the first fixed station 24, the second fixed station 25 and the third fixed station 26 may be simultaneously transmitted.

It is to be noted that the mobile station 19 is configured to receive the pulses and transmits the pulses after passing a predetermined response time. Therefore, the distance between each of the first fixed station 24, the second fixed station 25 and the third fixed station 26 and the mobile station 19 can be expressed by the following equation:

$$D = C \times \{(T\text{total} - T\text{response})/2\}$$

In the above equation, "D" represents a distance between the fixed stations and the mobile station. Further, "C" represents the light velocity. Further, "Ttotal" represents a time required for the fixed stations to receive the pulses after transmitting the pulses. Further, "Tresponse" represents a response time required for the mobile station to transmit the pulses after receiving the pulses.

It is to be noted that, in the above description, the first fixed station 24, the second fixed station 25 and the third fixed station 26 are stations which carry out the distance measurement and the mobile station 19 is a station which is a station to be a distance measurement target, but the mobile station 19 may be a station which carries out the distance measurement and the first fixed station 24, the second fixed station 25 and the third fixed station 26 may be stations which are stations to be distance measurement targets.

When the laser scanner 1 is installed at an arbitrary position, the pulses emitted from the first fixed station 24, the second fixed station 25 and the third fixed station 26 are received by the mobile station 19 through the antenna 18, respectively. Further, the mobile station 19 transmits pulses corresponding to the received pulses to the first fixed station 24, the second fixed station 25 and the third fixed station 26 through the antenna 18, respectively.

The first fixed station 24 calculates a distance "d1" between the mobile station 19 and the first fixed station 24 based on a round-trip time of the pulses with respect to the mobile station 19 and the light velocity. The second fixed station 25 calculates a distance "d2" between the mobile station 19 and the second fixed station 25 based on a round-trip time of the pulses with respect to the mobile station 19 and the light velocity. The third fixed station 26 calculates a distance "d3" between the mobile station 19 and the third fixed station 26 based on a round-trip time of the pulses with respect to the mobile station 19 and the light velocity.

The distance data calculated by the first fixed station 24, the second fixed station 25 and the third fixed station 26 is received by the mobile station 19 through the antenna 18 and is input to the arithmetic control module 21. It is to be noted that each of "d1" to "d3" calculated here includes an error of approximately 10 cm.

At this time, the antenna 18 is positioned on a circumference of a circle having a radius "d1" with the first fixed station 24 as a center. Further, the antenna 18 is positioned on a circumference of a circle having a radius "d2" with the second fixed station 25 as a center. Further, the antenna 18 is positioned on a circumference of a circle having a radius "d3" with the third fixed station 26 as a center.

Therefore, it can be considered that the antenna 18 is positioned at an intersection of the circle having the radius "d1" with the first fixed station 24 as a center, the circle having the radius "d2" with the second fixed station 25 as a center and the circle having the radius "d3" with the third fixed station 26 as a center.

The arithmetic control module 21 calculates a circle "A" based on coordinates of the first fixed station 24 and the distance "d1", calculates a circle "B" based on coordinates of the second fixed station 25 and the distance "d2" and calculates the circle "C" based on coordinates of the third fixed station 26 and the distance "d3". Therefore, the arithmetic control module 21 can calculate coordinates of the antenna 18 in a fixed station coordinate system with, for instance, the first fixed station 24 as an origin based on the circle "A", the circle "B" and the circle "C".

It is to be noted that the coordinates of the antenna 18 are calculated by the above-described processings, but the coordinates of the antenna 18 are the coordinates of the mobile station 19 in the following description.

Figure 2:
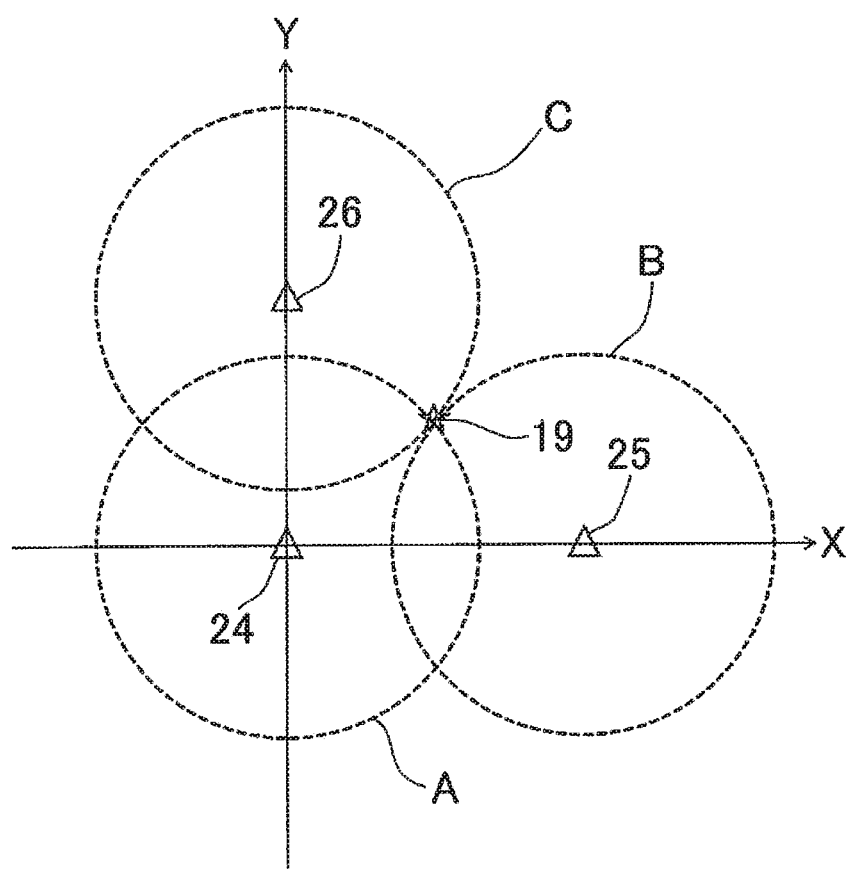
FIG. 2 is an explanatory drawing to explain a positioning of a mobile station according to the first embodiment of the present invention.

FIG. 2 shows a case where, in the fixed station coordinate system with the first fixed station 24 as the origin, the first fixed station 24 is arranged at "X, Y"=0 m, 0 m, the second fixed station 25 is arranged at "X, Y"=10 m, 0 m and the third fixed station 26 is arranged at "X, Y"=0 m, 10 m.

Further, as a result of the measurement, in a case where the distance between the mobile station 19 and each of the fixed stations 24 to 26 (d1, d2, d3) is 7.071 m, coordinates of the intersection of the circle "A", the circle "B" and the circle "C" are "X, Y"=5 m, 5 m.

Therefore, in the example of FIG. 2, the arithmetic control module 21 can calculate a position of the approximate mechanical point of the laser scanner 1 based on the calculated coordinates of the mobile station 19, the offset amount of the antenna 18 with respect to the mechanical point and the known coordinates of each of the fixed stations 24 to 26.

However, in the positioning using UWB, there is a case where an error of approximately 1 m occurs in the measurement result. In the present embodiment, a fact that the antenna 18 is offset to a known position with respect to the axis 7a is used, and a measurement accuracy of the approximate mechanical point is improved.

Specifically, the positioning of the mobile station 19 is performed at every predetermined angle while horizontally rotating the frame unit 6 by 360° around the axis 7a. A locus of the positioning results of the mobile station 19 obtained here has an approximate circular shape around the axis 7a.

Therefore, when the arithmetic control module 21 calculates average values of X-coordinates and Y-coordinates based on each positioning result, the arithmetic control module 21 can obtain a horizontal rotation center of the frame unit 6. That is, the average value of the X-coordinates becomes X-coordinates of the axis 7a, the average value of the Y-coordinates becomes Y-coordinates of the axis 7a, and the positioning of the approximate mechanical point coordinates can be performed with an improved accuracy beyond the accuracy of the positioning using UWB.

Figure 3:
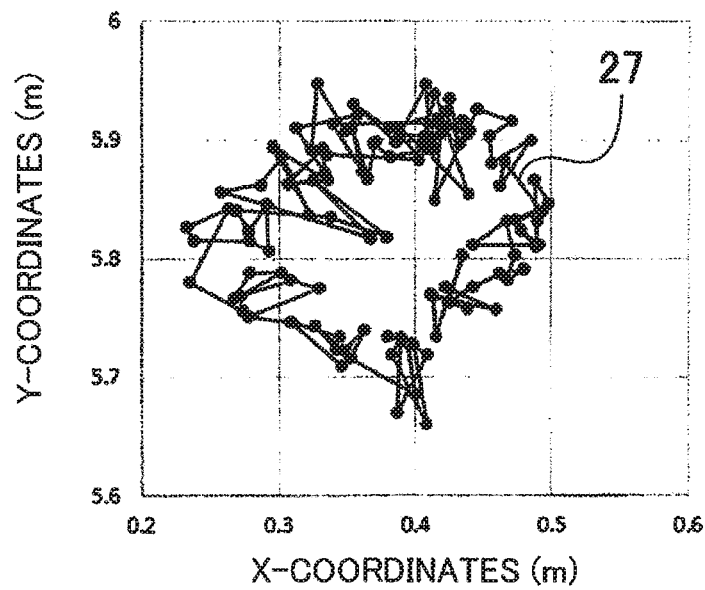
FIG. 3 is an explanatory drawing to show a locus of positioning results of a case where the positioning is performed while rotating the mobile station.

FIG. 3 shows a locus 27 of the coordinates of the mobile station 19 in a case where the positioning of the mobile station 19 is performed every time the frame unit 6 is rotated by 3° while horizontally rotating the frame unit 6 by 360°. Each positioning result obtained here is associated with a relative horizontal angle of the frame unit 6 with respect to the fixed station 5 (detection result of the horizontal angle encoder 11) and is stored in the storage module 22.

Figure 4:
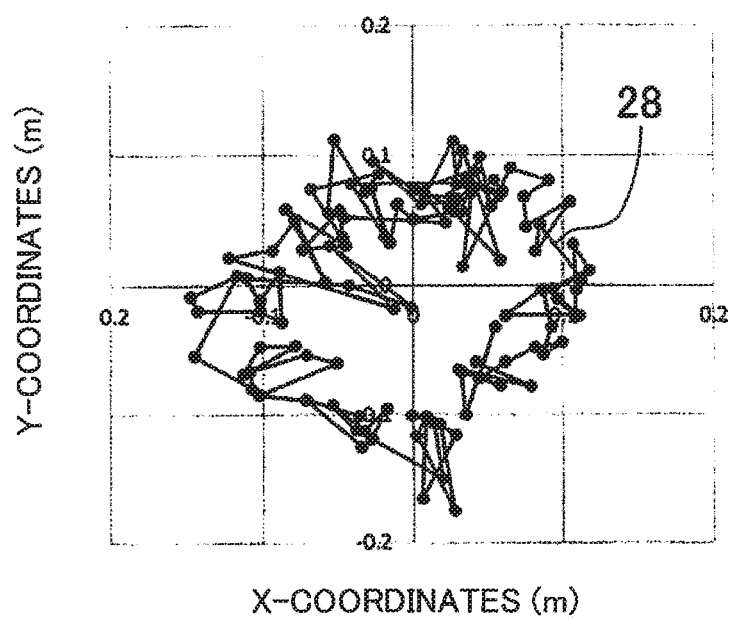
FIG. 4 is an explanatory drawing to show a case where a difference from an average value of the positioning results is calculated and a center of the locus is determined as an origin.

Further, a difference between X-coordinates and an average value of the X-coordinates of each positioning result of the locus 27 is calculated, and a difference between Y-coordinates and an average value of the Y-coordinates of each positioning result of the locus 27 is calculated. Thereby, it is possible to obtain a locus 28 of coordinates of a case where the mobile station 19 with the origin of the fixed station coordinate system (position of the first fixed station 24) as a center is rotated like the one shown in FIG. 4.

It is to be noted that there is a case where the positioning result of the approximate mechanical point coordinates performed in the present embodiment includes an error of approximately 30 cm. However, since the error which is 1 m or less brings about no problem, the approximate mechanical point coordinates can be used as an initial value in the ICP algorithm.

Next, a description will be given on a method for calculating an approximate azimuth of the laser scanner 1.

When obtaining an azimuth of the laser scanner 1, for instance, a state, where a straight line connecting the axis 7a with the antenna 18 is parallel to the X-axis and the antenna 18 is positioned on a positive side, is set as an approximate azimuth angle in a horizontal 0° direction.

Alternatively, in a case where the locus 28 with the origin of the fixed station coordinate system as a center is calculated, a state, where the antenna 18 is positioned on the positive X-axis, is set as an approximate azimuth angle in the horizontal 0° direction.

An angle (approximate rotation angle) formed between the straight line connecting the axis 7a with the antenna 18 and the X axis or a straight line parallel to the X-axis (reference axis) can be calculated by an arc tangent based on the X-Y coordinates of the mechanical point and the positioning result (X-Y coordinates) of the mobile station 19. The calculated approximate rotation angle is associated with the X-Y coordinates of the mobile station 19 and stored in the storage module 22.

Here, the relative horizontal angle detected by the horizontal angle encoder 11 is associated with each positioning result (X-Y coordinates) of the mobile station 19. Therefore, the approximate rotation angle can be associated with the relative horizontal angle based on the X-Y coordinates of the mobile station 19.

Figure 5:
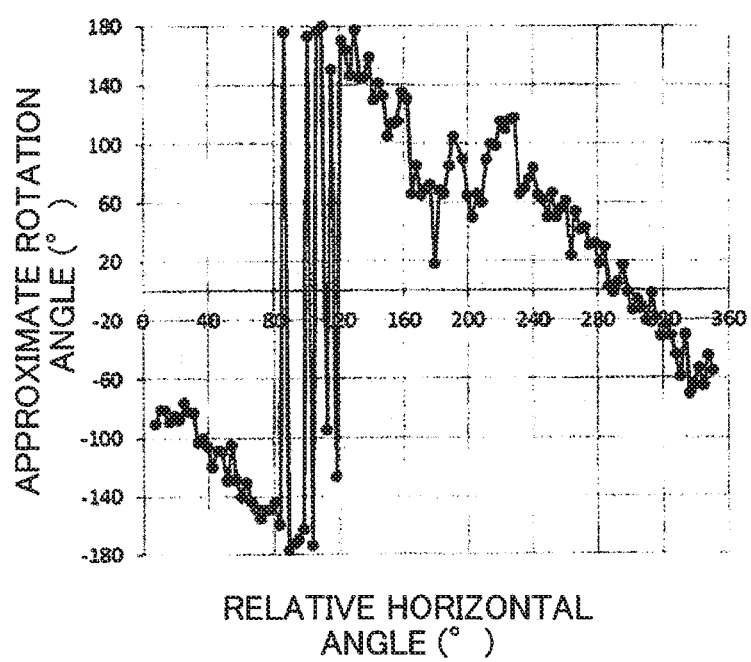
FIG. 5 is an explanatory drawing to show a relationship between a relative horizontal angle and an approximate rotation angle of when the positioning is performed while rotating the mobile station.

FIG. 5 shows a graph in which the approximate rotation angle is shown on an axis of ordinate, the relative horizontal angle is shown on an axis of abscissa, and the approximate rotation angle and the relative horizontal angle are corresponded with each other. As shown in FIG. 5, when the relative horizontal angle is approximately 300°, the approximate rotation angle is 0°. That is, a direction along which the relative horizontal angle is approximately 300° can be calculated as the approximate azimuth angle of the laser scanner 1 in the horizontal 0° direction with respect to the coordinate system (fixed station coordinate system) formed of the first fixed station 24, the second fixed station 25 and the third fixed station 26.

It is to be noted that there is a case where the approximate azimuth angle calculated in the present embodiment includes an error of, for instance, approximately ±20°. However, since an error which is ±30° or less brings about no problem, the approximate azimuth angle can be used as an initial value in the ICP algorithm.

In a case where the laser scanner 1 is moved to a different position, the approximate mechanical point coordinates and the approximate azimuth angle of the laser scanner 1 can be likewise calculated by the above processings.

At the time of performing the registration of a plurality of three-dimensional point cloud data by the ICP algorithm, the approximate mechanical point coordinates and the approximate azimuth angle of the laser scanner 1 calculated at each point are input to the ICP algorithm as initial values. Thereby, the arithmetic control module 21 can automatically and assuredly perform the registration of the plurality of three-dimensional point cloud data by using the ICP algorithm.

As described above, in the first embodiment, the antenna 18 is offset and provided at a known value with respect to the mechanical point. Further, the mobile station 19 is performed the positioning at every predetermined angle while horizontally rotating the frame unit 6 by 360°, and the average values obtained by averaging the X-coordinates and the Y-coordinates of each of the positioning results are calculated as the approximate mechanical point coordinates.

Therefore, as compared with a case where the antenna 18 is concentrically provided with the mechanical point and the positioning of the approximate mechanical point coordinates are automatically performed by UWB, an error can be reduced, and a positioning accuracy of the approximate mechanical point coordinates can be improved.

Further, in the first embodiment, the approximate rotation angle and the relative horizontal angle are associated with each other based on the positioning result of the approximate mechanical point coordinates. Therefore, the approximate azimuth angle in the horizontal 0° direction with respect to the fixed station coordinate system can be automatically calculated without additionally providing an azimuth indicator or the like.

Further, in the first embodiment, the approximate mechanical point coordinates and the approximate azimuth angle are calculated at each of the points where the plurality of three-dimensional point cloud data are acquired respectively, and the calculated approximate mechanical point coordinates and approximate azimuth angle are determined as initial values, and the registration of the plurality of three-dimensional point cloud data is automatically performed by the ICP algorithm.

Therefore, at the time of performing the registration, the worker does not need to manually match directions and the like of the three-dimensional point cloud data and to attach the target sheets in a building. As a result, a reduction in work time and an improvement in work efficiency can be achieved.

Further, in the first embodiment, the approximate mechanical point coordinates are calculated based on the distances between the first fixed station 24, the second fixed station 25 and the third fixed station 26, and the mobile station 19, the approximate azimuth angle is calculated based on the approximate mechanical point coordinates, and the registration is carried out based on the approximate mechanical point coordinates and the approximate azimuth angle.

Therefore, even in a place like a tunnel where the positioning by a GNSS device is impossible, the registration of a plurality of three-dimensional point cloud data can be performed.

It is to be noted that, in the first embodiment, the average values obtained by averaging the X-coordinates and the Y-coordinates of each of the positioning results corresponding to a total circumference respectively are determined as the approximate mechanical point coordinates. On the other hand, since a horizontal distance between the axis 7a and the antenna 18 is known, a circle having the horizontal distance as a radius may be fitted with a locus of each of the positioning results corresponding to the total circumference, and a center of the fitted circle may be calculated as the approximate mechanical point coordinates.

Further, in the first embodiment, the positioning of the mobile station 19 is performed by using the three fixed stations 24 to 26, but the number of the fixed stations may be four or more. For instance, in case of using four fixed stations, the distances between each of the fixed stations and the mobile station 19 are calculated respectively, four circles each with a corresponding fixed station as a center and the distance to the mobile station 19 as a radius are calculated, an intersection of the four circles is calculated as an installation position of the mobile station 19. This can be likewise applied to a case where the number of the fixed stations is five or more.

Next, a description will be given on a second embodiment of the present invention in FIG. 6 and FIG. 7. It is to be noted that, in FIG. 6 and FIG. 7, the equivalent components as shown in FIG. 2 are referred by the same symbols, and a description thereof will be omitted. Further, in the second embodiment, likewise, an installation surface is flat, and a height of a mechanical point does not change irrespective of an installation position of a laser scanner 1.

In the first embodiment, a first fixed station 24, a second fixed station 25 and a third fixed station 26 are installed at known points respectively, but in the second embodiment, the first fixed station 24, the second fixed station 25 and the third fixed station 26 are installed at unknown points.

The first fixed station 24 obtains distances to the second fixed station 25 and the third fixed station 26, the second fixed station 25 obtains distances to the first fixed station 24 and the third fixed station 26, and the third fixed station 26 obtains distances to the first fixed station 24 and the second fixed station 25.

Figure 6:
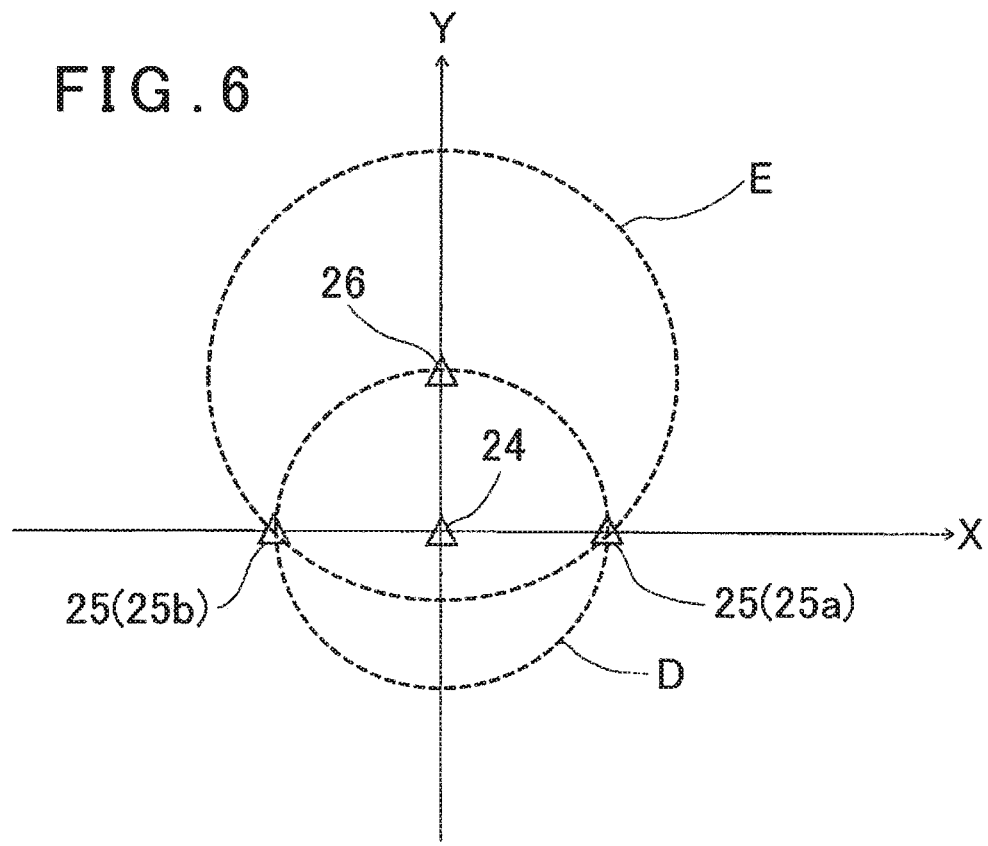
FIG. 6 is an explanatory drawing to show candidate positions of fixed stations according to a second embodiment of the present invention.

For instance, FIG. 6 shows a case where a distance between the first fixed station 24 and the second fixed station 25 is 10 m, a distance between the first fixed station 24 and the third fixed station 26 is 10 m, and a distance between the second fixed station 25 and the third fixed station 26 is 14.14 m.

Further, FIG. 6 shows a case where, in a coordinate system (fixed station coordinate system) constituted of each of the fixed stations 24 to 26, the fixed station coordinate system is set in such a manner that the first fixed station 24 is positioned at an origin (0 m, 0 m) and the third fixed station 26 is positioned on a Y-axis on a positive side (0 m, 10 m).

In the above-described setting, the second fixed station 25 is positioned at one of two points (candidate position 25a, 25b) at which a circle "D" having a radius 10 m with the first fixed station 24 as a center crosses a circle "E" having a radius 14.14 m with the third fixed station 26 as a center. That is, the second fixed station 25 is positioned at one of two symmetrical points on an X-axis with respect to a Y-axis (straight line connecting the first fixed station 24 with the third fixed station 26).

However, an arithmetic control module 21 cannot determine which one of the two candidate positions 25a and 25b of the second fixed station 25 on the X-axis on the positive side and the X-axis on the negative side is a correct arrangement.

Figure 7:
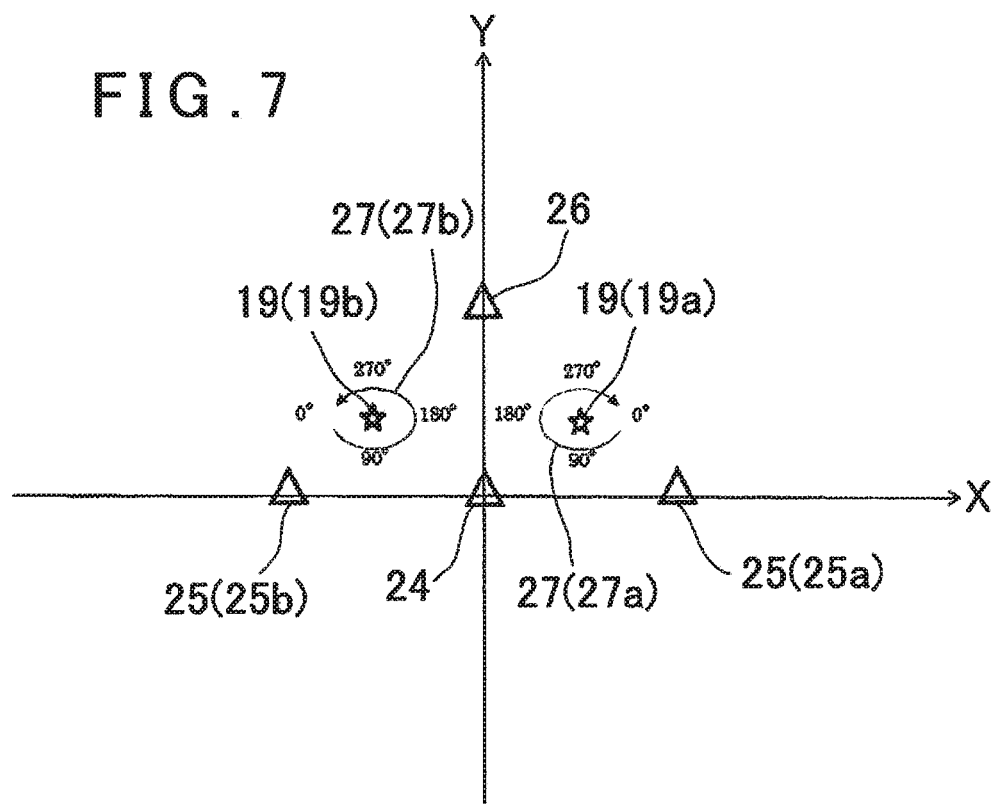
FIG. 7 is an explanatory drawing to show a difference in a direction along which a locus is obtained when a mobile station is positioned at each candidate position.

As shown in FIG. 7, in a case where the mobile station 19 is installed at an arbitrary position in this state, there are two points (candidate positions 19a, 19b) which are symmetrical on the positive side and the negative side with respect to the Y-axis as candidates for a position of the mobile station 19. Regarding the mobile station 19, likewise, the arithmetic control module 21 cannot determine which one of the mobile station 19 positioned on the positive side (the candidate position 19a) and the mobile station 19 positioned on the negative side (the candidate position 19b) is a correct arrangement.

According to the second embodiment, in a state where the positions of the mobile station 19 and the second fixed station 25 are unknown, a positioning of the mobile station 19 is performed at every predetermined angle while horizontally rotating a frame unit 6 (see FIG. 1) by 360° around an axis 7a (see FIG. 1).

A rotational direction of a locus 27 of the mobile station 19 obtained by the first fixed station 24, the second fixed station 25 and the third fixed station 26 is reversely changed depending on whether the positive side or the negative side the second fixed station 25 is positioned on (27a, 27b in FIG. 7). For instance, the locus 27a is obtained in a clockwise direction in case of the mobile station 19 positioned at the candidate position 19a, and the locus 27b is obtained in a counterclockwise direction in case of the mobile station 19 positioned at the candidate position 19b.

The arithmetic control module 21 can compare a rotational direction of the frame unit 6 with the rotational directions of the loci 27a and 27b and determine a locus having a rotational direction which coincides with the rotational direction of the frame unit 6 as the correct locus 27. For instance, when the frame unit 6 rotates in the clockwise direction, the arithmetic control module 21 can determined that the locus 27a is a correct locus.

When the locus 27a is determined to be the correct locus, the arithmetic control module 21 can determine that the candidate position 19a and the candidate position 25a in FIG. 7 are the correct arrangement of the movable station 19 and the second fixed station 25. Therefore, an arrangement of the second fixed station 25 is identified, and the position (coordinates) of the mobile station 19 in a fixed station coordinate system can be identified.

After identifying the positions of the mobile station 19 and the second fixed station 25, approximate mechanical point coordinates and an approximate azimuth angle of the laser scanner 1 are calculated by the same processings as the processings in the first embodiment. That is, the approximate mechanical point coordinates and the approximate azimuth angle are input as initial values of an ICP algorithm, and a registration of a plurality of three-dimensional point cloud data is automatically carried out.

In the second embodiment, the approximate mechanical point coordinates and the approximate azimuth angle of the laser scanner 1 can be calculated without installing the first fixed station 24, the second fixed station 25 and the third fixed station 26 at known points.

Therefore, since the installation positions of the movable station 19, the first fixed station 24, the second fixed station 25 and the third fixed station 26 can be all arbitrary, it is not necessary to obtain coordinates of the installation points in advance, further it is not necessary to perform a positional adjustment of the installation points and the first fixed station 24, the second fixed station 25 and the third fixed station 26, and the workability can be further improved.

It is to be noted that, in the second embodiment, the first fixed station 24, the second fixed station 25 and the third fixed station 26 are all installed at the unknown points of which coordinates are unknown. However, some of the first fixed station 24, the second fixed station 25 and the third fixed station 26 may be installed at known points, and the positions of the remaining fixed stations may be identified by a method of the second embodiment.

Further, in the second embodiment, the three fixed stations 24 to 26 are used and the positioning of the mobile station 19 is performed, but the number of the fixed stations may be four or more. In case of installing four fixed stations, the positions of two fixed stations in the fixed station coordinate system are set. Next, two circles having the fixed stations of which positions are set as their centers and the distances to the other two fixed stations as their radii respectively are calculated for each fixed station of which position is set. That is, the circles having the fixed stations of which positions are set as their centers are calculated two by two.

In the above case, since pairs of the intersections of the circles having the distance to the same fixed station as their radii are present, the number of candidate positions of the other two fixed stations is four. However, there are only two combination patterns in which a distance between the other two fixed stations in the fixed station coordinate system coincides with a measuring distance between the other two fixed stations. Therefore, the combination of the coordinate positions are two patterns similar to a case where three fixed stations are used. This can be likewise applied to a case where the number of the fixed stations is five or more.

Next, a description will be given on a third embodiment of the present invention in FIG. 8. It is to be noted that, in FIG. 8, the equivalent components as shown in FIG. 2 are referred by the same symbols, and a description thereof will be omitted. Further, in the third embodiment, likewise, an installation surface is flat, and a height of a mechanical point does not change irrespective of an installation position of a laser scanner 1.

In a registration of three-dimensional point cloud data, it is necessary to acquire three-dimensional point cloud data at a plurality of points while moving an installation position of the laser scanner 1. In a positioning using UWB, in order to highly accurately perform a positioning of a mobile station 19, it is desirable to position the mobile station 19 in a triangle formed by three fixed stations 24, 25, and 26.

However, when the laser scanner 1 is moved, there is a case where the mobile station 19 is arranged outside the triangle. In this case, in order to maintain a positioning accuracy of the mobile station 19, it is necessary to rearrange the first fixed station 24, the second fixed station 25 and the third fixed station 26 in such a manner that the mobile station 19 is positioned in the triangle.

Figure 8:
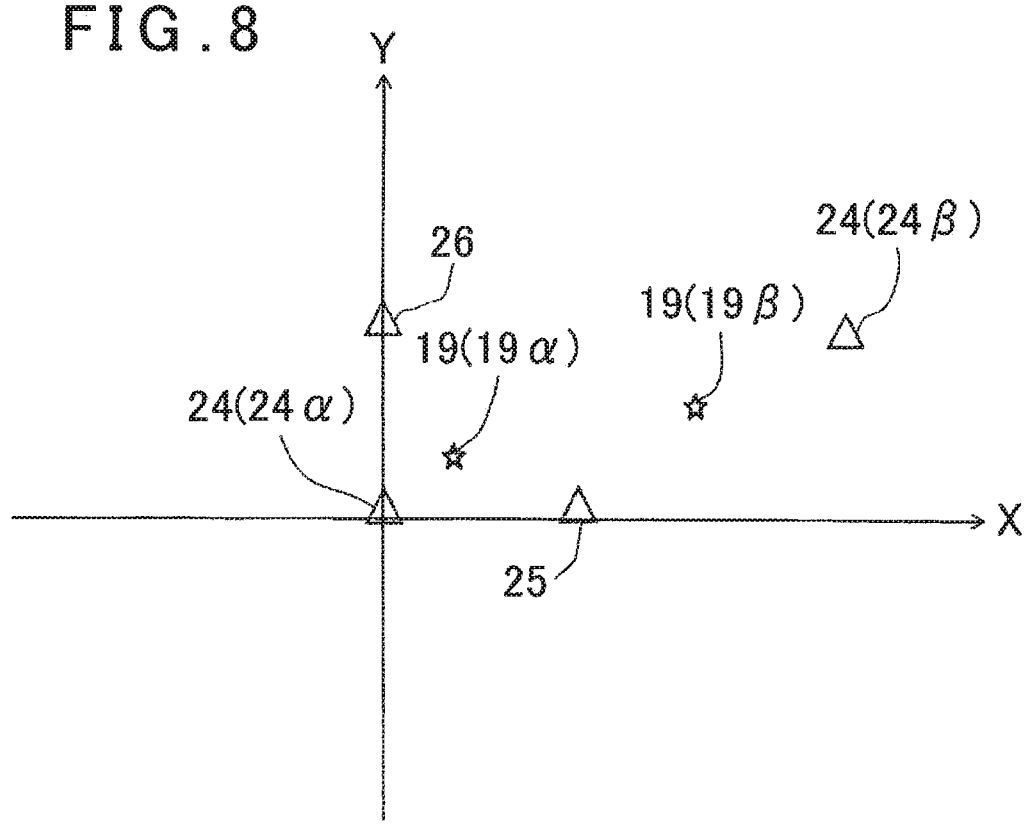
FIG. 8 is an explanatory drawing to show a case where a fixed station and a mobile station according to a third embodiment of the present invention are moved.

FIG. 8 shows a state where the first fixed station 24 and the mobile station 19 are moved from the arrangement of the first embodiment shown in FIG. 2. That is, FIG. 8 shows a state where the first fixed station 24 is moved from a first position 24α to a second position 24β, and the mobile station 19 is moved from a first position 19α to a second position 19β.

In a case where the first fixed station 24 is moved to a known point (the second position 24β), the mobile station 19 is moved to an arbitrary position (the second position 19β) in the triangle formed by the first fixed station 24, the second fixed station 25 and the third fixed station 26. Approximate mechanical point coordinates and an approximate azimuth angle of the mobile station 19 can be calculated by the same processings as the processings in the first embodiment.

Further, in a case where the first fixed station 24 is moved to an unknown point, a position of the first fixed station 24 positioned at the second position 24β is identified by the same processings as the processings in the second embodiment, and approximate mechanical point coordinates and an approximate azimuth angle of the mobile station 19 positioned at the second position 19β are calculated.

Both the approximate mechanical point coordinates and the approximate azimuth angle calculated here are approximate mechanical point coordinates and an approximate azimuth angle in a fixed station coordinate system. Therefore, since the approximate mechanical point coordinates and the approximate azimuth angles of the mobile station 19 obtained at the first position 19α and the second position 19β are values in the same coordinate system, the registration of the plurality of three-dimensional point cloud data can be assuredly and automatically carried out.

Next, a description will be given on a fourth embodiment of the present invention in FIG. 9.

Figure 9:
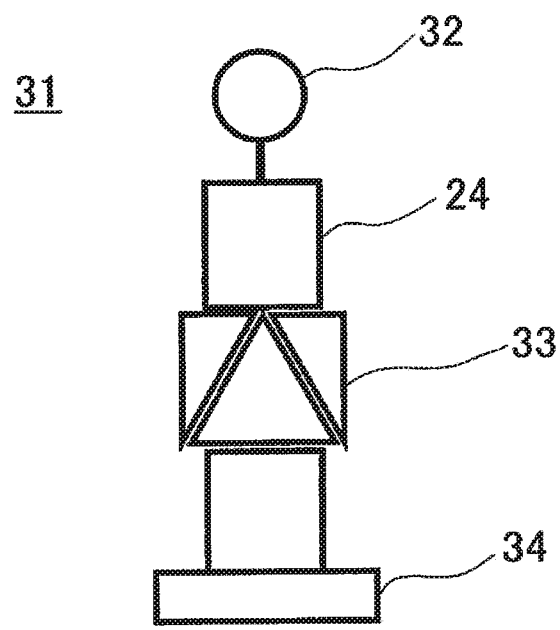
FIG. 9 is a front view to show a fixed station device according to a fourth embodiment of the present invention.

FIG. 9 shows a fixed station device 31. It is to be noted that a fixed station device using a first fixed station 24, a fixed station device using a second fixed station 25 and a fixed station device using a third fixed station 26 have the same configuration, and hence a description will be given below on the fixed station device 31 using the first fixed station 24.

The fixed station device 31 has a configuration in which an antenna 32, the first fixed station 24 connected with the antenna 32, a target 33 provided at a known position with respect to the antenna 32 and a fixed portion 34 configured to be attachable and detachable to and from a metal structure such as a magnet are integrated.

In the fourth embodiment, since the fixed station device 31 has the target 33, the fixed station device 31 can be measured by a laser scanner 1 or a different surveying instrument such as a total station. Therefore, the surveying instrument can input coordinates to the first fixed station 24, the coordinates of the first fixed station 24 can be easily obtained, and hence the work efficiency can be improved.

It is to be noted that, as the target 33, an object having a retro-reflectivity, for instance, a 360° prism, a single-element prism, a reflective sheet, a checker target or a sphere can be applied.

Further, it is desirable that the fixed portion 34 is an electromagnet and attaches and detaches to and from a structure by turning on/off of a switch. Further, the fixed portion 34 may be configured to be attachable and detachable to and from a surveying instrument such as a base portion.

Further, the target 33 may be measured by the laser scanner 1 on which the mobile station 19 provided, or a surveying instrument such as a total station or a laser scanner may be additionally provided, and the target 33 may be measured by the surveying instrument.

Further, when the target 33 is measured, three-dimensional coordinates of the first fixed station 24, that is, a height can be also measured, and hence this configuration can be likewise applied to a case where an installation surface where the positioning is performed is not flat.

Figure 10:
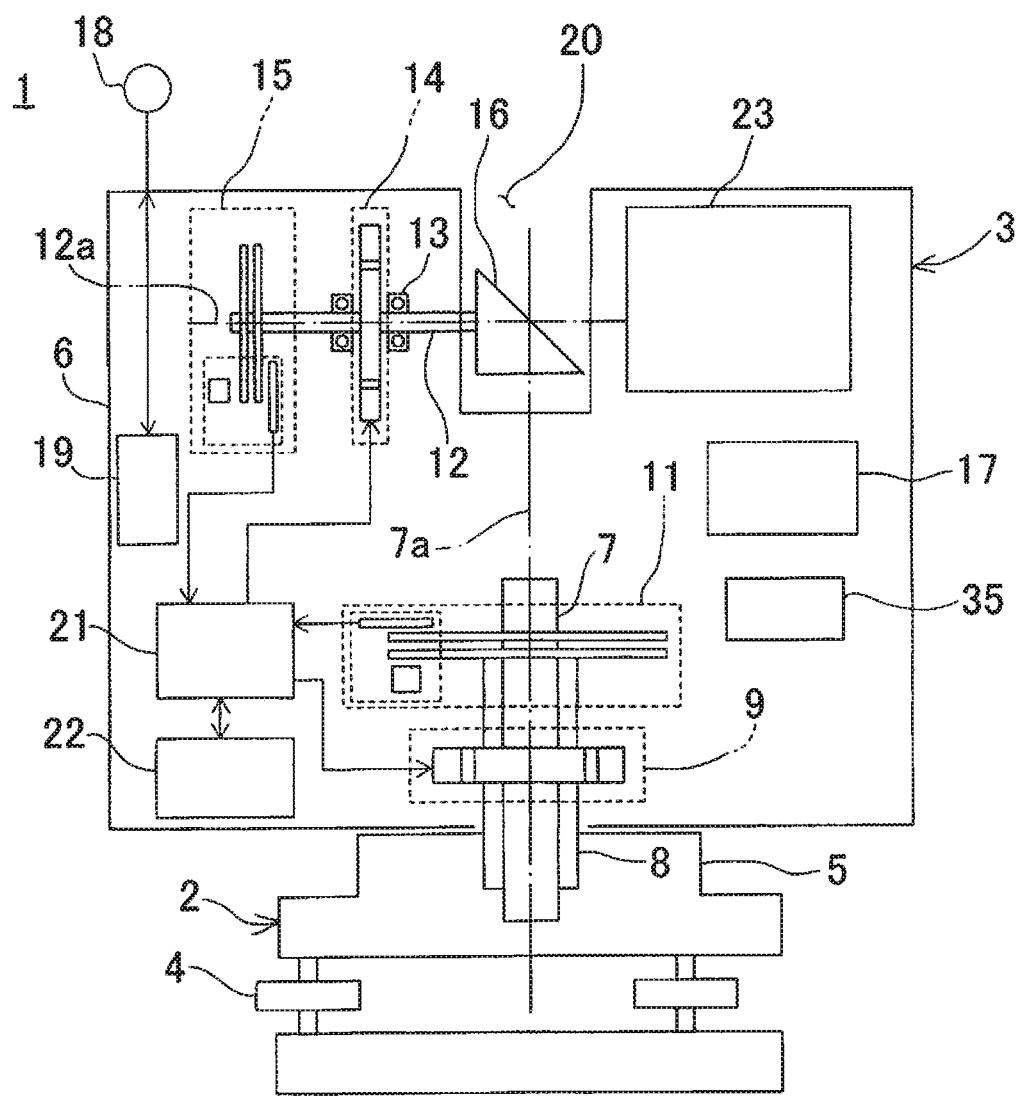
FIG. 10 is a front cross-sectional view to show a laser scanner according to a fifth embodiment of the present invention.

Next, a description will be given on a fifth embodiment of the present invention in FIG. 10. It is to be noted that, in FIG. 10, the equivalent components as shown in FIG. 1 are referred by the same symbols, and a description thereof will be omitted.

In the fifth embodiment, a barometric sensor 35 is additionally provided in a scanner main body 3. The barometric sensor 35 is configured to enable a measurement of a height in units of 10 cm. Other structures are the same as the structures in the laser scanner 1 of the first embodiment. Further, although not shown, a barometric sensor is provided in at least one of a first fixed station 24, a second fixed station 25 and a third fixed station 26.

In the first embodiment to the third embodiment, the description is given on the positionings in a case where an installation surface of the laser scanner 1 is flat and a height of a mechanical point does not change. For instance, in case of performing a registration of three-dimensional point cloud data acquired on the same floor of a building, since an installation surface is basically flat, the first embodiment to the third embodiment can be applied directly.

On the other hand, there is also a case where it is difficult to install all of the mobile station 19, the first fixed station 24, the second fixed station 25 and the third fixed station 26 on a flat and the same installation surface, like a stair portion. In this case, in addition to the first fixed station 24, the second fixed station 25 and the third fixed station 26 installed on the flat surface, a fixed station installed on an installation surface having a different height is additionally provided. Thereby, heights (Z-coordinates) of the first fixed station 24, the second fixed station 25 and the third fixed station 26 can be obtained.

However, in order to highly accurately obtain the heights, as a condition, there is no obstacle between the first fixed station 24, the second fixed station 25, and the third fixed station 26, and the additionally provided fixed station. Further, in order to highly accurately obtain the heights, it is necessary to increase a difference between the heights of the first fixed station 24, the second fixed station 25 and the third fixed station 26, and a height of the additionally provided fixed station, and hence the implementation is difficult.

In the fifth embodiment, an arithmetic control module 21 can calculate a relative height of the mobile station 19 with respect to the fixed stations based on a difference between a barometric pressure detected by the barometric sensor 35 and a barometric pressure detected by the barometric sensor provided in at least one of the first fixed station 24, the second fixed station 25 and the third fixed station 26. That is, relative Z-coordinates of the mobile station 19 with respect to the fixed stations can be calculated, and the relative Z-coordinates can be used as Z-coordinates when performing the positioning.

Therefore, even in a case where the installation surface is not flat and the mobile station 19, the first fixed station 24, the second fixed station 25 and the third fixed station 26 are not provided on the same flat surface, the positioning of the mobile station is possible.

It is to be noted that the barometric sensor may be provided in each of the first fixed station 24, the second fixed station 25 and the third fixed station 26. When the barometric sensors are provided respectively, it is possible to input the Z-coordinates to the first fixed station 24, the second fixed station 25 and the third fixed station 26 respectively, and a positioning accuracy of the mobile station can be improved.

The invention claimed is:

1. A laser scanner system comprising a laser scanner which has a mobile station and for acquiring three-dimensional point cloud data, and at least three fixed stations, wherein said laser scanner comprises a mobile station which is offset to a known position from a mechanical point on a horizontal rotation axis of said laser scanner, a horizontal angle detecting module for detecting a relative horizontal angle of said laser scanner and an arithmetic control module for controlling a horizontal rotation of said laser scanner, wherein said fixed stations are configured to emit pulses to said mobile station and to measure distances to said mobile station by receiving the pulses from said mobile station, and wherein said arithmetic control module is configured to calculate a two-dimensional fixed station coordinate system formed each of said fixed stations, to calculate coordinates of intersections of at least three circles, which have said fixed stations as their centers and the distances between each of said fixed stations and said mobile station as their radii, at every predetermined angle as each positioning result of said mobile station while horizontally rotating said laser scanner by 360.degree. around said mechanical point, to average each of the positioning results corresponding to 360.degree. and to calculate approximate mechanical point coordinates in said fixed station coordinate system.

2. The laser scanner system according to claim 1, wherein said arithmetic control module corresponds an approximate rotation angle formed by a straight line connecting said mechanical point with said mobile station and a reference axis of said fixed station coordinate system with said relative horizontal angle detected by said horizontal angle detecting module based on the positioning results of said mobile station and calculates said relative horizontal angle of when said approximate rotation angle becomes 0.degree. as an approximate azimuth angle.

3. The laser scanner system according to claim 2, wherein said arithmetic control module determines said calculated approximate mechanical point coordinates and approximate azimuth angle as initial values and integrates a plurality of three-dimensional point cloud data acquired by said laser scanner.

4. The laser scanner system according to claim 3, wherein each of said fixed stations has known three-dimensional coordinates.

5. The laser scanner system according to claim 3, wherein each of said fixed stations is configured to measure distances to the other fixed stations, and wherein said arithmetic control module sets positions of two of said fixed stations in said fixed station coordinate system, calculates two candidate positions of said remaining fixed station based on at least two points at which at least two circles having said two fixed stations as their centers and distances to said remaining fixed station as their radii cross each other, obtains a locus of the positioning results of said mobile station at each candidate position respectively and determines said candidate position having a locus obtained in a rotational direction which coincides with a rotational direction of a frame unit as an installation position of said remaining fixed station.

6. The laser scanner system according to claim 4, wherein, after calculating said approximate mechanical point coordinates and said approximate azimuth angle, one of said fixed stations and said mobile station are moved, and said arithmetic control module again calculates said approximate mechanical point coordinates and said approximate azimuth angle.

7. The laser scanner system according to claim 4, wherein barometric sensors are provided in said mobile station and at least one of said fixed stations respectively, and said arithmetic control module calculates a relative height of said mobile station with respect to said fixed station based on detection results by each of said barometric sensors and calculates three-dimensional approximate mechanical point coordinates based on the calculated height.

8. The laser scanner system according to claim 1, wherein each of said fixed stations is provided in a fixed station device respectively, and said fixed station device comprises a target of which three-dimensional coordinates can be measured by said laser scanner.

9. The laser scanner system according to claim 5, wherein, after calculating said approximate mechanical point coordinates and said approximate azimuth angle, one of said fixed stations and said mobile station are moved, and said arithmetic control module again calculates said approximate mechanical point coordinates and said approximate azimuth angle.

10. The laser scanner system according to claim 5, wherein barometric sensors are provided in said mobile station and at least one of said fixed stations respectively, and said arithmetic control module calculates a relative height of said mobile station with respect to said fixed station based on detection results by each of said barometric sensors and calculates three-dimensional approximate mechanical point coordinates based on the calculated height.

11. The laser scanner system according to claim 6, wherein barometric sensors are provided in said mobile station and at least one of said fixed stations respectively, and said arithmetic control module calculates a relative height of said mobile station with respect to said fixed station based on detection results by each of said barometric sensors and calculates three-dimensional approximate mechanical point coordinates based on the calculated height.

12. The laser scanner system according to claim 9, wherein barometric sensors are provided in said mobile station and at least one of said fixed stations respectively, and said arithmetic control module calculates a relative height of said mobile station with respect to said fixed station based on detection results by each of said barometric sensors and calculates three-dimensional approximate mechanical point coordinates based on the calculated height.

13. The laser scanner system according to claim 2, wherein each of said fixed stations is provided in a fixed station device respectively, and said fixed station device comprises a target of which three-dimensional coordinates can be measured by said laser scanner.

14. The laser scanner system according to claim 3, wherein each of said fixed stations is provided in a fixed station device respectively, and said fixed station device comprises a target of which three-dimensional coordinates can be measured by said laser scanner.

15. The laser scanner system according to claim 4, wherein each of said fixed stations is provided in a fixed station device respectively, and said fixed station device comprises a target of which three-dimensional coordinates can be measured by said laser scanner.

16. The laser scanner system according to claim 5, wherein each of said fixed stations is provided in a fixed station device respectively, and said fixed station device comprises a target of which three-dimensional coordinates can be measured by said laser scanner.

17. The laser scanner system according to claim 6, wherein each of said fixed stations is provided in a fixed station device respectively, and said fixed station device comprises a target of which three-dimensional coordinates can be measured by said laser scanner.

18. The laser scanner system according to claim 7, wherein each of said fixed stations is provided in a fixed station device respectively, and said fixed station device comprises a target of which three-dimensional coordinates can be measured by said laser scanner.

\* \* \* \* \*